United States Patent [19]

Taylor et al.

[11] 4,171,875
[45] Oct. 23, 1979

[54] VEHICLE REAR VIEW MIRROR WITH INDICATOR LAMP

[76] Inventors: Solomon Taylor, 13 Eastleigh Ave., Salford 7; Leslie Ormandy, 58 Hodge Rd., Worsley, Lancashire, both of England

[21] Appl. No.: 827,472

[22] Filed: Aug. 25, 1977

[51] Int. Cl.² ............................................. G02B 5/08
[52] U.S. Cl. ................................. 350/289; 340/98
[58] Field of Search .................. 350/289, 279; 340/98

[56] References Cited

U.S. PATENT DOCUMENTS

| | | | |
|---|---|---|---|
| 1,913,874 | 6/1933 | Folberth et al. | 350/289 |
| 2,806,408 | 9/1957 | Moeller | 350/289 |
| 3,063,342 | 11/1962 | Zeek | 350/289 |
| 3,522,583 | 8/1970 | Russell | 350/289 |
| 3,873,190 | 3/1975 | Hess | 350/289 |

FOREIGN PATENT DOCUMENTS

| | | | |
|---|---|---|---|
| 2036818 | 1/1972 | Fed. Rep. of Germany | 350/289 |
| 622692 | 5/1949 | United Kingdom | 350/279 |

*Primary Examiner*—Jon W. Henry
*Attorney, Agent, or Firm*—Ross, Ross & Flavin

[57] ABSTRACT

A rear view mirror for a vehicle includes a member, providing a reflective surface and mounted so as to be swingable about a vertical axis, and an operating mechanism, which may be powered from the vehicle's battery or by a self-contained power unit, or other suitable electrical, mechanical, hydraulic or pneumatic means, which operating mechanism serves, under the control of the driver of the vehicle, to swing the member about its vertical axis between two preset positions so as to change the field of view presented by the reflective surface.

4 Claims, 4 Drawing Figures

VEHICLE REAR VIEW MIRROR WITH INDICATOR LAMP

BACKGROUND OF THE INVENTION

This invention concerns a vehicle rear view mirror.

Many forms of rear view mirrors are already known. In general, known rear view mirrors suffer from the same disadvantage, namely that they give the vehicle driver an inadequate field of view resulting in the creation of "blind spots" or areas into which the vehicle driver cannot see. Attempts have been made to correct this deficiency by the provision of convex mirrors, a combination of convex and planar mirrors, or of two or more mirrors positioned so as to provide different fields of view. Although such mirror arrangements may increase the field of view available to the vehicle driver, they have one or more equally serious disadvantages, such as distorted vision, crossed fields of view in different reflecting surfaces and increased projection from the vehicle in the case of exterior rear view mirrors.

An object of the present invention is to provide an improved vehicle rear view mirror which does not suffer from the above-discussed disadvantages.

SUMMARY OF THE INVENTION

The present invention provides a vehicle rear view mirror, comprising a reflective surface, and operating means for swinging the reflective surface about a substantially-vertical axis between two pre-set positions to thereby change the field of view presented by the reflective surface.

The reflective surface may be mounted on a pivotally drivable base within a housing, the base being driven in any suitable manner to effect angular movement of the reflective surface relative to the housing.

Alternatively, the reflective surface may be mounted within a housing about a substantially vertical fulcrum, the reflective surface being swingable about the fulcrum by the operating means.

The fulcrum may be provided centrally of the reflective surface or at one side thereof, and may be provided with at least one pivot.

Alternatively, the reflective surface may be supported by a backing plate which is integral with a mounting arm extending from one side of the reflective surface, the fulcrum being a relatively thin strip of the backing plate material forming a transition between the backing plate and the mounting arm.

Preferably, the operating means includes a solenoid mounted within the housing and arranged to swing the reflective surface about the fulcrum between a first position and a second position relative to the housing, and a control switch electrically connected in series with the solenoid for controlling its operation.

Alternatively, the operating means may include a ferrous component movable with the reflective surface, an electromagnet mounted within the housing so as to act upon the ferrous component to swing the reflective surface about the fulcrum between a first position and a second position relative to the housing, and a control switch electrically connected in series with the electromagnet for controlling its operation.

The operating means also may include an indicator lamp series-connected with a microswitch which is closable upon movement of the reflective surface into its second position, whereby the indicator lamp is switched ON to indicate the presence of the reflective surface in its second position.

The indicator lamp and the microswitch preferably are electrically connected in parallel with the solenoid or electromagnet.

The reflective surface is preferably a single piece of silvered glass or plastics material, which may be of planar, convex form.

Preferably, the housing is provided with a plain glass face or window through which the reflective surface can be viewed.

BRIEF DESCRIPTION OF THE DRAWINGS

The invention will be described further, by way of example, with reference to the accompanying drawings, in which.

DESCRIPTION OF THE ILLUSTRATED EMBODIMENTS

Figure 1:
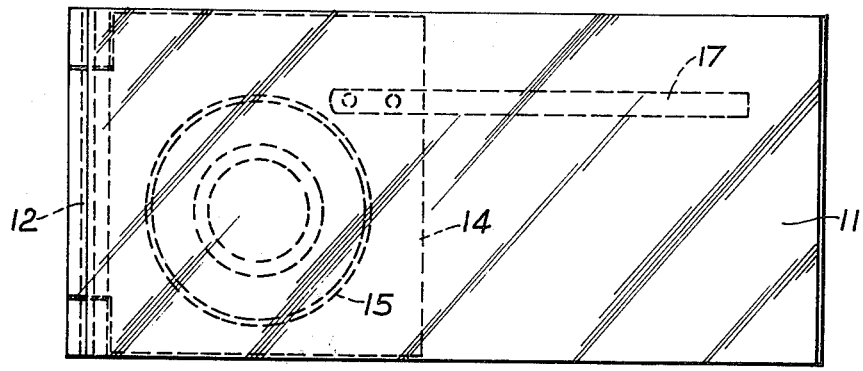
FIG. 1 is a front view of a first embodiment of vehicle rear view mirror in accordance with the invention.

In the various figures, like parts are denoted by like reference numerals.

Figure 2:
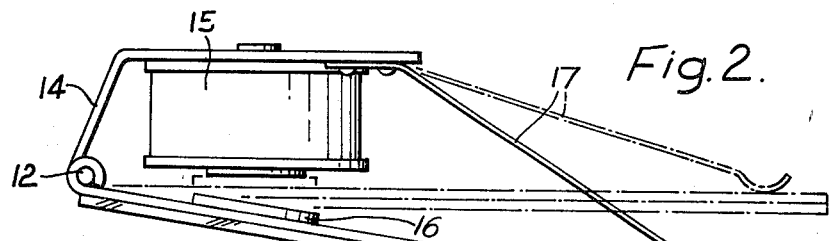
FIG. 2 is a plan view of the mirror shown in FIG. 1.

The vehicle rear view mirror shown in FIGS. 1 and 2 comprises a single plane reflective surface 11, preferably a mirror of silvered glass or plastics material. The reflective surface 11 is approximately 6 inches×4 inches and is mounted in a housing 9, (see FIG. 3) adapted to be attached to a suitable location on the vehicle, such as to a front wing or door of the vehicle. The reflective surface 11 is so arranged within the housing that, when the housing is mounted for use, the long side edges of the reflective surface are substantially horizontal, as shown. Mounting of the reflective surface 11 is achieved by a vertical pivot 12 provided at one side edge of the reflective surface 11 and which locates a backing plate 13 with a mounting arm 14 which may be secured inside the housing.

Behind the reflective surface 11 and its backing plate 13 at the non-viewed side thereof, there is provided an electromagnet 15 which is mounted on the arm 14 inside the housing. A ferrous plate 16 is mounted at the rear of the reflective surface 11 and cooperates with the electromagnet 15 so that, upon activation of the electromagnet, the plate 16 is moved a short distance by the electromagnet so as to pivot the reflective surface 11 through a small angle from a first position (FIG. 2, full outline) to a second position (FIG. 2, phantom outline) thereof relative to the housing 9. Upon deactivation of the electromagnet, the reflective surface 11 is returned to its first position by means of a spring 17. Stops (not shown) are provided inside the housing to limit pivotal movement of the reflective surface 11 in both directions, the angle of movement being about 10°. A switch (not shown) is provided to control operation of the electromagnet. This control switch is electrically connected in series with the electromagnet and may be mounted inside the vehicle at any desired location suitable, and preferably convenient, for operation by the vehicle driver.

An indicator lamp, mounted on the housing for viewing by the vehicle driver, is series connected with a micro switch which is mounted inside the housing so as to be closable by movement of the reflective surface 11 into its second position. The indicator lamp and the micro switch are electrically connected in parallel with the electromagnet 15. Thus, when the vehicle driver operates the control switch, the electromagnet is activated to pivot the reflective surface 11 from its first position to its second position. Upon reaching its second position, the reflective surface 11 contacts and closes the micro switch to complete the electrical circuit through the indicator lamp which is accordingly switched ON to give the vehicle driver a clear indication of the presence of the reflective surface in its second position.

The respective fields of view presented by the reflective surface 11 in its two positions may be adjusted by making a fine adjustment to the mounting of the housing on the vehicle, in the same manner as with a conventional rear view mirror. When correctly mounted, the first position of the reflective surface gives a normal rear view relatively close to the vehicle, whilst the second position thereof gives a field of view at a wider angle, i.e. relatively further from the vehicle. Accordingly, such a mirror mounted on the vehicle off-side will, upon closing of the control switch, present the vehicle driver with an improved field of view to the vehicle rear off-side, this being particularly useful preparatory to overtaking another vehicle, when changing to an outer traffic line, or when entering a motorway or other major road from a slip road.

Preferably, such a rear view mirror is used in conjunction with a similar mirror mounted on the vehicle rear side. The reflective surface of this rear side mirror is movable oppositely to that of the off side mirror so that, in its first position, it presents a field of view relatively close to the vehicle and, in its second position, it presents a field of view further towards the near side edge of the road. This provision is particularly useful preparatory to changing to an inner traffic lane of a motorway. Where two mirrors are so arranged, they are preferably connected to a single control switch.

The electromagnet 15 may be powered by the vehicle electrical system or by a replaceable dry-cell battery.

Figure 3:
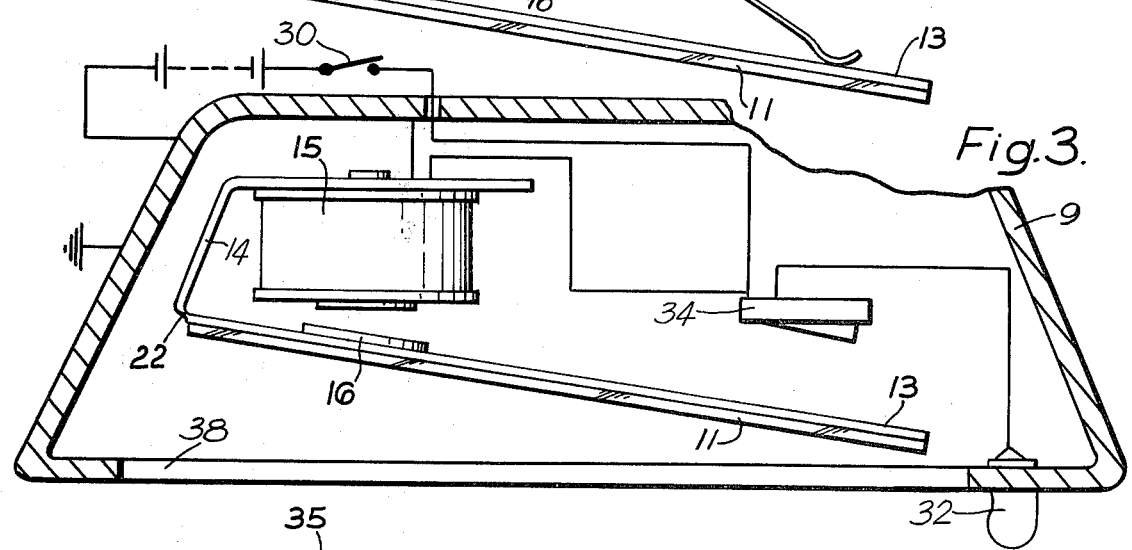
FIG. 3 is a plan view of a second embodiment of vehicle rear view mirror.

The rear view mirror shown in FIG. 3 is generally similar to that of FIGS. 1 and 2, but is modified in that the spring 17 is omitted and its function performed by the spring-like property of a fulcrum 22 between the backing plate 13 and the mounting arm 14. To achieve this, the backing plate and the mounting arm are integrally formed of a plastics material such as nylon, the fulcrum being a relatively thin strip of the plastics material forming a transition between the backing plate and the mounting arm. The plastics material is moulded to a shape defining the relative positions assumed by the backing plate and the mounting arm when the backing plate is in its normal first position, as shown. Upon activation of the electromagnet 15, the backing plate 13 is swung about the fulcrum 22 into its second position and, upon de-activation of the electromagnet, the backing plate returns automatically to its first position as a result of the resilient property inherent in the plastics material.

Figure 4:
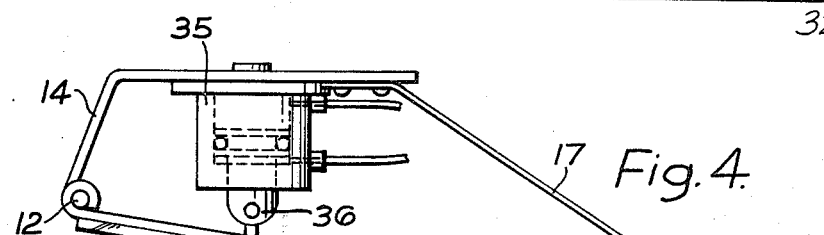
FIG. 4 is a plan view of a third embodiment of vehicle rear view mirror.
Figure 5:
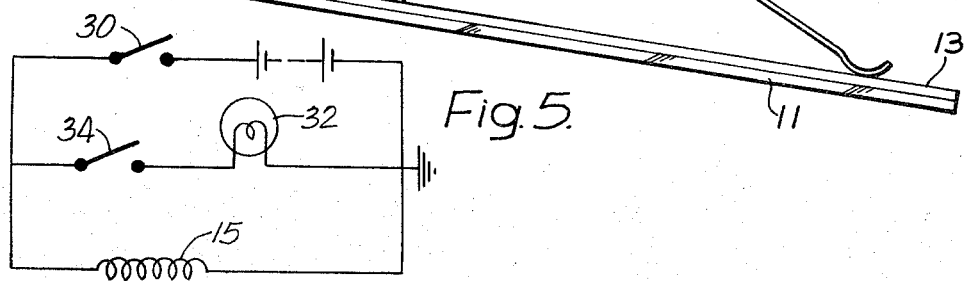

The rear view mirror shown in FIG. 4 is also generally similar to that of FIGS. 1 and 2, but here the electromagnet 15 is replaced by a pneumatic or hydraulic cylinder 35 which acts upon a connecting rod 36 pivotally attached to the backing plate 13. The cylinder 35 may be double-acting so that the reflective surface 11 is positively moved to and retained in either its first or second position. However, the spring 17 is retained to bias the reflective surface 11 towards its normal first position, as shown.

It will be appreciated that detail modifications may be made without departing from the scope of the invention. For example, any suitable operating means may be provided for swinging the reflective surface between its two positions. Such alternative operating means may be, for example, a pivotally drivable base on which the reflective surface is mounted, the base being driven in any suitable manner to effect angular movement of the reflective surface. Thus, the swinging can be arranged to be effected by a current or voltage input figure derived from an external source or an integrally mounted source and/or power pack.

We claim:

1. A vehicle rear view mirror comprising: a housing, a reflective surface, operating means for swinging the reflective surface about a substantially vertical axis between two pre-set positions for changing the field of view presented by the reflective surface, the reflective surface being mounted within the housing about a substantially vertical fulcrum providing the vertical axis and being swingable about the fulcrum by the operating means, the fulcrum being provided at one side of the reflective surface, the reflective surface being supported by a plastic backing plate integral with a mounting arm extending from one side of the reflective surface, the fulcrum being a relatively thin strip of the plastic forming a transition between the backing plate and mounting arm, the operating means including a solenoid mounted within the housing and arranged to swing the reflective surface about the fulcrum between the first and second pre-set positions, a control switch electrically connected in series with the solenoid for controlling operation thereof, and an indicator lamp series-connected with a microswitch closable upon movement of the reflective surface into the second position with the indicator lamp being thereby switched ON for indicating the presence of the reflective surface in the second position.

2. A mirror as set forth in claim 1 in which the indicator lamp and microswitch are electrically connected in parallel with the solenoid.

3. A vehicle rear view mirror comprising: a housing, a reflective surface, operating means for swinging the reflective surface about a substantially vertical axis between two pre-set positions for changing the field of view presented by the reflective surface, the reflective surface being mounted within the housing about a substantially vertical fulcrum providing the vertical axis and being swingable about the fulcrum by the operating means, the fulcrum being provided at one side of the reflective surface, the reflective surface being supported by a plastic backing plate integral with a mounting arm extending from one side of the reflective surface, the fulcrum being a relatively thin strip of the plastic forming a transition between the backing plate and mounting arm, the operating means including a ferrous component movable with the reflective surface, an electromagnet mounted within the housing for acting upon the ferrous component to swing the reflective surface about the fulcrum between the first and second positions, and a control switch electrically connected in series with the electromagnet for controlling operation thereof, and an indicator lamp series-connected with a microswitch closable upon movement of the reflective surface into the second position with the indicator lamp being thereby switched ON for indicating the presence of the reflective surface in the second position.

4. A mirror as set forth in claim 3 in which the indicator lamp and microswitch are electrically connected in parallel with the electromagnet.

* * * * *